(12) United States Patent
Pasqua et al.

(10) Patent No.: US 10,239,579 B2
(45) Date of Patent: Mar. 26, 2019

(54) BICYCLE ELECTRIC REAR DERAILLEUR

(71) Applicant: Campagnolo S.r.l., Vicenza (IT)

(72) Inventors: Paolo Pasqua, Camisano Vicentino (IT); Davide Bernardele, Caldogno (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 15/899,728

(22) Filed: Feb. 20, 2018

(65) Prior Publication Data

US 2018/0237104 A1 Aug. 23, 2018

(30) Foreign Application Priority Data

Feb. 20, 2017 (IT) .................. 102017000018702

(51) Int. Cl.
| | |
|---|---|
| *B62M 25/00* | (2006.01) |
| *B62M 25/08* | (2006.01) |
| *B62M 9/122* | (2010.01) |
| *B62M 9/125* | (2010.01) |
| *B62M 9/1242* | (2010.01) |

(52) U.S. Cl.
CPC ............ *B62M 9/122* (2013.01); *B62M 9/125* (2013.01); *B62M 9/1242* (2013.01); *B62M 25/08* (2013.01); *B62M 2025/006* (2013.01)

(58) Field of Classification Search
CPC ...... B62M 25/08; B62M 9/122; B62M 9/132; B62M 9/1242; B62K 23/06
USPC ..................................................... 474/80, 82
See application file for complete search history.

(56) References Cited

U.S. PATENT DOCUMENTS

| | | | | |
|---|---|---|---|---|
| 6,162,140 A | * | 12/2000 | Fukuda | .................. B62M 9/122 474/70 |
| 6,623,389 B1 | * | 9/2003 | Campagnolo | .......... B62M 9/122 474/70 |
| 6,945,888 B2 | * | 9/2005 | Fukuda | .................... B62J 99/00 474/70 |
| 7,320,655 B2 | * | 1/2008 | Fukuda | ................ B62M 9/1242 474/70 |

(Continued)

FOREIGN PATENT DOCUMENTS

| | | |
|---|---|---|
| DE | 10 2013 004 887 A1 | 4/2014 |
| DE | 10 2013 004 966 A1 | 4/2014 |

(Continued)

OTHER PUBLICATIONS

Italian Search Report and Written Opinion in Italian Application No. 102017000018702, dated Oct. 19, 2017, with English translation.

*Primary Examiner* — Henry Y Liu
(74) *Attorney, Agent, or Firm* — Volpe and Koenig, P.C.

(57) ABSTRACT

A bicycle electric rear derailleur that has a support body configured to be mounted on a bicycle frame at an assembly of wheels coaxial with a hub of a rear wheel of the bicycle, a movable body, having a chain guide and linkage between the movable body and the support body. The linkage between the movable body and the support body comprises an inner connecting rod and an outer connecting rod. The ends of the rods are articulated to the support body and to the movable body to form an articulated parallelogram. A battery power supply unit is supported by one of the inner connecting rod and the outer connecting rod.

20 Claims, 8 Drawing Sheets

(56) References Cited

U.S. PATENT DOCUMENTS

| | | | |
|---|---|---|---|
| 7,331,890 B2* | 2/2008 | Ichida | B62M 9/132 474/80 |
| 7,341,532 B2* | 3/2008 | Ichida | B62M 9/132 474/70 |
| 7,704,173 B2* | 4/2010 | Ichida | B62M 25/08 474/80 |
| 8,137,223 B2* | 3/2012 | Watarai | B62K 23/06 280/260 |
| 8,721,495 B2* | 5/2014 | Kitamura | B62J 6/06 477/7 |
| 8,974,331 B2* | 3/2015 | Yamaguchi | B62M 9/122 474/80 |
| 8,979,683 B2 | 3/2015 | Katsura et al. | |
| 8,998,756 B2* | 4/2015 | Ichida | B62K 23/06 474/70 |
| 9,005,059 B2* | 4/2015 | Suyama | B62M 9/122 474/80 |
| 9,303,763 B2* | 4/2016 | Yamaguchi | F16H 61/68 |
| 9,334,017 B2* | 5/2016 | Sala | B62M 9/124 |
| 10,040,511 B2* | 8/2018 | Shipman | B62M 9/132 |
| 2004/0102270 A1* | 5/2004 | Fukuda | B62M 9/122 474/82 |
| 2005/0239587 A1* | 10/2005 | Ichida | B62M 9/122 474/82 |
| 2007/0037645 A1* | 2/2007 | Ishikawa | B62M 9/132 474/80 |
| 2008/0227572 A1* | 9/2008 | Sakaue | B62M 9/122 474/82 |
| 2009/0209375 A1* | 8/2009 | Takamoto | B62M 9/122 474/18 |
| 2009/0240858 A1* | 9/2009 | Takebayashi | B62M 25/08 710/110 |
| 2011/0320093 A1* | 12/2011 | Kitamura | B62K 23/06 701/51 |
| 2012/0322594 A1* | 12/2012 | Kitamura | B62J 6/06 474/110 |
| 2014/0087901 A1* | 3/2014 | Shipman | B62M 9/132 474/82 |
| 2014/0102237 A1* | 4/2014 | Jordan | B62K 23/02 74/473.12 |
| 2014/0114538 A1* | 4/2014 | Shipman | B62M 9/132 701/51 |
| 2014/0128189 A1* | 5/2014 | Kuwayama | B62M 9/1342 474/82 |
| 2014/0296009 A1* | 10/2014 | Suyama | B62M 9/122 474/80 |
| 2014/0303857 A1* | 10/2014 | Takamoto | B62M 25/00 701/51 |
| 2014/0371953 A1* | 12/2014 | Miller | B62M 25/08 701/2 |
| 2015/0111675 A1* | 4/2015 | Shipman | B62M 9/122 474/82 |
| 2016/0221640 A1* | 8/2016 | Watarai | B62M 25/08 |
| 2016/0257269 A1* | 9/2016 | Watarai | B62J 99/00 |
| 2016/0288878 A1* | 10/2016 | Shipman | B62M 9/132 |
| 2016/0311499 A1* | 10/2016 | Kasai | B62M 25/08 |
| 2017/0050701 A1* | 2/2017 | Feuerstein | B62M 25/08 |
| 2017/0096185 A1* | 4/2017 | Hara | B62J 1/08 |
| 2017/0101155 A1* | 4/2017 | Tachibana | H04W 4/70 |
| 2017/0101162 A1* | 4/2017 | Tachibana | B62M 25/08 |
| 2017/0113759 A1* | 4/2017 | Watarai | B62M 9/122 |
| 2017/0120983 A1* | 5/2017 | Komatsu | B62M 9/122 |
| 2017/0197685 A1* | 7/2017 | Braedt | B62M 9/122 |
| 2017/0247082 A1* | 8/2017 | Katsura | B62M 9/132 |
| 2017/0253296 A1* | 9/2017 | Shipman | B62M 9/122 |
| 2018/0001960 A1* | 1/2018 | Pasqua | B62M 9/132 |
| 2018/0229803 A1* | 8/2018 | Wesling | B62M 9/122 |
| 2018/0274623 A1* | 9/2018 | Brown | B62M 9/128 |

FOREIGN PATENT DOCUMENTS

| | | |
|---|---|---|
| DE | 10 2016 001 333 A1 | 9/2016 |
| EP | 1 568 593 B1 | 1/2007 |
| EP | 1 752 373 B1 | 11/2008 |
| EP | 1 424 275 B1 | 3/2010 |
| EP | 1 970 299 B1 | 9/2011 |
| EP | 2 090 505 B1 | 10/2011 |
| EP | 2 727 810 A2 | 5/2014 |
| EP | 2 865 589 A1 | 4/2015 |
| EP | 2 712 799 B1 | 9/2015 |
| EP | 2 719 616 B1 | 6/2016 |
| EP | 2 722 266 B1 | 10/2016 |
| WO | 2004/016496 A1 | 2/2004 |

* cited by examiner

US 10,239,579 B2

BICYCLE ELECTRIC REAR DERAILLEUR

CROSS REFERENCE TO RELATED APPLICATION

This application claims the benefit of Italian Application No. 102017000018702, filed on Feb. 20, 2017, which is incorporated herein by reference as if fully set forth.

FIELD OF INVENTION

The present invention relates to a bicycle electric rear derailleur of an electronically servo-assisted gearshift—hereinafter briefly called electronic gearshift—and in particular to a rear derailleur provided with its own power supply battery.

BACKGROUND

With reference to FIG. 1, a motion transmission system in a bicycle 1100 comprises a chain 1101 extending between toothed wheels 1102, 1103 associated with the axle of the pedal cranks 1104 and with the hub 1105 of the rear wheel 1106. When—as in the case shown—at at least one of the axle of the pedal cranks 1104 and the hub 1105 of the rear wheel 1106 there is a group of toothed wheels 1102, 1103 comprising more than one toothed wheel 1102, 1103, and the motion transmission system is therefore provided with a gearshift 1110, a front derailleur 1111 and/or a rear derailleur 1112 are provided for.

In the case of an electronic gearshift, control electronics change the gear ratio automatically, for example based on one or more detected variables such as the travel speed, the cadence of rotation of the pedal cranks, the torque applied to the pedal cranks, the slope of the travel terrain, the heart rate of the cyclist and similar, and/or the gear ratio is changed based on commands manually input by the cyclist through suitable control members, for example levers and/or buttons, typically provided on one or two manual control devices 1107 mounted on the handlebars 1108 of the bicycle 1100.

In the case of a mechanical gearshift, the gear ratio is changed based on commands manually input by the cyclist through suitable control members, typically levers, typically provided on the manual control devices 1107 mounted on the handlebars 1108 of the bicycle 1100.

Each derailleur 1111, 1112 includes a support body 1113, 1114 that is configured to be attached to or mounted on the frame 1109 of the bicycle 1100, and a movable body 1115, 1116 comprising a chain guide 1117, 1118 movable to displace the chain 1101 among the toothed wheels 1102, 1103 in order to change the gear ratio. The chain guide 1117, 1118 is also called cage in the case of a front derailleur, and rocker arm in the case of a rear derailleur.

In the case of an electronic gearshift, the movable body 1115, 1116 comprising the chain guide 1117, 1118 is moved through an electromechanical actuator. Each electromechanical actuator in turn typically comprises a motor, typically an electric motor, coupled with the movable body through a linkage. Typically, the electric motor is provided with a gear reduction mechanism. The assembly of electric motor and gear reduction mechanism is referred to hereinafter as geared motor. The actuator typically further comprises a sensor or transducer of the position, speed, acceleration and/or direction of rotation, of the rotor of the motor or of any movable part downstream of the rotor, down to the chain guide 1117, 1118 itself. It is worth emphasizing that slightly different terminology from that used in this context is also in use.

In the case of a mechanical gearshift, the movable body 1115, 1116 comprising the chain guide 1117, 1118 is moved through an analogous linkage controlled by the traction and release of an inextensible, usually sheathed cable (Bowden cable); in the manual control device 1107 a mechanism for controlling the traction of the cable is provided, typically comprising a cable-winding bush and an indexer to determine the rotation and the stopping of the cable-winding bush in predetermined positions—"indexed bush" or "bush-indexer assembly"—as well as one or more manual actuation members, typically of the lever type, to control the bush-indexer assembly.

In the case of a rear derailleur 1112, the linkage typically comprises two connecting rods, the ends of which are articulated to the support body 1114 and to the movable body 1116 to form an articulated parallelogram. The geared motor, the Bowden cable respectively, drives the articulated parallelogram open and close, and consequently controls the displacement of the chain guide 1118 among the toothed wheels 1103.

In some known electronic gearshifts a central battery power supply unit is provided, shared by all of the components of the gearshift 1110, and typically arranged in a rather central position on the bicycle frame 1109. U.S. Pat. No. 9,005,059 B2 describes a rear derailleur wherein the motor is electrically connected to a remote battery power supply unit.

In other electronic gearshifts, a battery power supply unit dedicated to the rear derailleur 1112 (besides one or more other battery power supply unit/s dedicated to the other components of the gearshift) is provided. In such cases, the battery power supply unit is typically supported on the bicycle frame 1109 close to the support body 1114 of the rear derailleur 1112, like for example in U.S. Pat. No. 8,979,683 B2 or in EP 2 727 810 A2. DE 10 2016 001 333 A1 discloses a battery power supply unit a support bracket of which is mounted on the frame with a same fixing device as the derailleur.

Furthermore, the battery power supply unit can be supported on the support body 1114 itself of the rear derailleur 1112—examples of such a derailleur can be found in EP 2 865 589 A1, US 2016/0221640 A1, as well as in EP 2 722 266 B1, EP 1 752 373 B1, which in particular disclose a front derailleur.

Indeed, it has always been believed, in the field of bicycle components, that the linkage of the derailleur should move an as light as possible load, so as not to require particularly great sizing and strength and, in the case of an electronic gearshift, so as to be able to exploit an as small as possible electric motor and with as low as possible electrical power consumption in order to allow the maximum possible autonomy away from the electrical network.

Moreover, EP 2 712 799 B1 discloses a rear derailleur wherein the battery power supply unit is connected to one of the support body and the movable body, the motor being placed on the other one.

Italian patent application no. 102016000069087, still secret at the date of first filing of the present patent application, discloses a bicycle front electric derailleur comprising a support body that is configured to be attached to a bicycle frame, a chain guide connected to the support body through a linkage, an electric motor that controls the linkage to displace the chain guide among toothed wheels of a motion transmission system, and a battery power supply unit, characterized in that the battery power supply unit is supported by the chain guide.

SUMMARY

The Applicant, solving the technical problem of providing a bicycle electric rear derailleur having an alternative configuration, has now overcome the prejudices of the prior art indicated above.

In one aspect, the solution relates to a bicycle electric rear derailleur comprising:

a support body, configured to be mounted on a frame of a bicycle at an assembly of toothed wheels coaxial with a hub of a rear wheel of the bicycle, a movable body, comprising a chain guide, a linkage between the movable body and the support body, comprising an inner connecting rod and an outer connecting rod, the ends of which are articulated to the support body and to the movable body to form an articulated parallelogram, a battery power supply unit, wherein the battery power supply unit is supported by one of the inner connecting rod and the outer connecting rod.

With such a configuration, the spaces are better exploited and the aerodynamics are improved. Furthermore, the battery power supply unit is better protected against impacts and less visible.

BRIEF DESCRIPTION OF THE DRAWINGS

The features and advantages of the present invention will become clearer from the following detailed description of some preferred embodiments thereof, made with reference to the attached drawings. The different features illustrated and described with reference to the single configurations can be combined with each other as desired. In the following description, to illustrate the figures identical or similar reference numerals are used to indicate structural or functional elements with the same function or analogous function. In the drawings.

DESCRIPTION OF THE PREFERRED EMBODIMENTS

Figure 1:
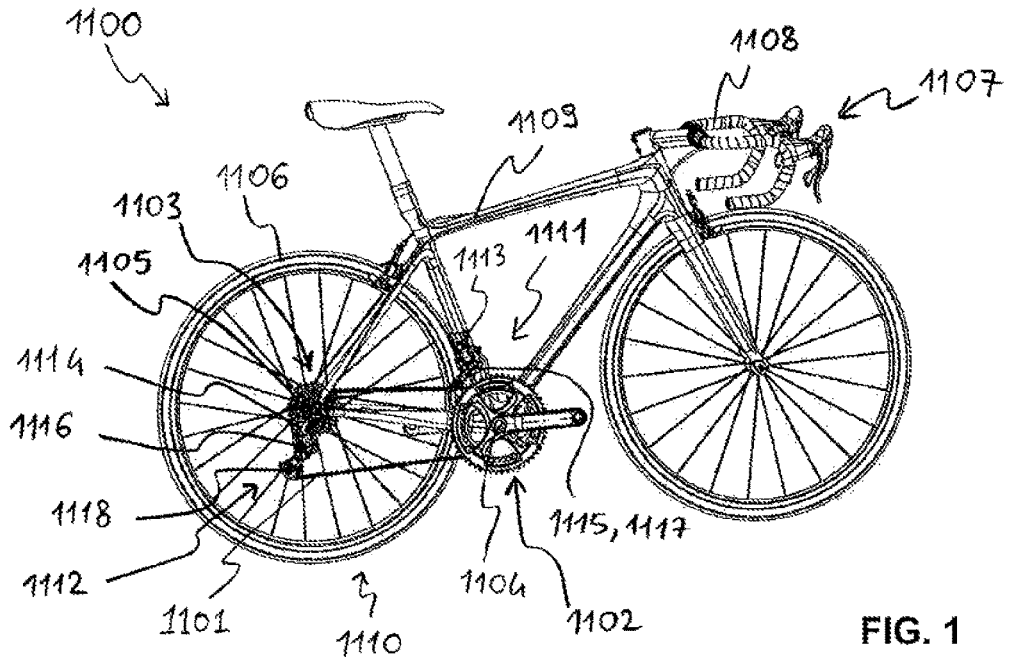
FIG. 1, already described in detail, is a side view of a bicycle equipped with an electronic gearshift according to the prior art.

As noted previously, the solution uses one of the inner connecting rod and the outer connecting rod associated with an articulated parallelogram to support a battery power supply unit.

In the present description and in the attached claims, under "inner" the side closest to the bicycle frame in the mounted condition of the derailleur is meant to be indicated, while under "outer" the side furthest from the bicycle frame in the mounted condition of the derailleur is meant to be indicated.

Preferably, the battery power supply unit is supported by the inner connecting rod.

In this way, it is even better protected against impacts and less visible. Furthermore, it is housed in the space occupied by the linkage, and therefore it has a smaller effective occupied space and less aerodynamic impact.

Alternatively, the battery power supply unit can be supported by the outer connecting rod, so as to be more easily accessible.

Preferably, the battery power supply unit extends mainly, namely a greatest part thereof extends, between the plane defined by the articulation axes of the connecting rods to the support body, and the plane defined by the articulation axes of the connecting rods to the movable body.

Alternatively or in addition, the battery power supply unit preferably extends between the plane defined by the two articulation axes of the inner connecting rod and the plane defined by the two articulation axes of the outer connecting rod.

In embodiments, the battery power supply unit is supported by said one connecting rod of the inner connecting rod and the outer connecting rod in an ordinarily removable manner.

In the present description and in the attached claims, under "ordinarily removable" it is meant to be indicated that the holding means of the battery power supply unit are configured so that it can be separated from the connecting rod for normal operations, in particular for ordinary charging; the term is used as opposed to an "extraordinary" removability for maintenance purposes.

In particular, the support qualifies as ordinarily removable if the holding means can be released without requiring the linkage of the derailleur to be dismounted.

Furthermore, in particular, the support qualifies as ordinarily removable if the holding means can be released with a simple and quick operation also by a user of the bicycle, even very frequently, without requiring the intervention of a specialized operator or maintenance service.

In particular, the battery power supply unit is intended to be separated from the connecting rod to carry out charging operations thereof, for example in a dedicated charging cradle and/or to replace it with another one that is already charged.

In some of these embodiments, the battery power supply unit is removably held in a compartment made in said one of the inner connecting rod and the outer connecting rod.

In other embodiments, the battery power supply unit is removably held in a container supported by, but separate and distinct from, said one of the inner connecting rod and the outer connecting rod.

A mouth of the compartment or of the container, respectively, is accessible with mounted linkage.

In some embodiments, the battery power supply unit is supported by said one of the inner connecting rod and the outer connecting rod in a non-ordinarily removable manner.

In some of these embodiments, the battery power supply unit is inserted within a compartment made in said one of the inner connecting rod and the outer connecting rod, the compartment being firmly closed.

In other of these embodiments, the battery power supply unit is housed in a container supported by, but separate and distinct from, said one of the inner connecting rod and the outer connecting rod, wherein the container is firmly closed.

In embodiments, the container is supported by said one of the inner connecting rod and the outer connecting rod in such a manner as to be dismountable only with dismounted linkage.

In embodiments, the battery power supply unit is seated in a compartment made in said one of the inner connecting rod and the outer connecting rod.

In other embodiments, the battery power supply unit is housed in a container supported by, but separate and distinct from, said one of the inner connecting rod and the outer connecting rod.

The battery power supply unit can be removably held in said compartment or in said container.

The battery power supply unit can be inserted within said compartment or said container, and the compartment or container can be firmly closed. Preferably, said compartment or container is firmly closed in a sealed manner.

In the various embodiments indicated above, the container can be fixed to said one of the inner connecting rod and the outer connecting rod in a removable or non-removable manner, in particular co-moulded.

In the present description and in the attached claims, under "removably" it is meant to be indicated that it is possible to disconnect the two components without breaking or damaging either one.

The container can be removably fixed to said one of the inner connecting rod and the outer connecting rod through threaded coupling devices.

Alternatively, the container can be removably fixed to said one of the inner connecting rod and the outer connecting rod through a screw system and a slider device that defines a seating-and-extraction direction of the battery power supply unit.

Yet alternatively, the container can be non-removably fixed to said one of the inner connecting rod and the outer connecting rod, in particular through co-moulding.

Preferably, when the battery power supply unit is removably held in said compartment or in said container, respectively, the battery power supply unit has a laterally projecting wall that, in the seated condition of the battery power supply unit, abuts on a mouth of said compartment or of said container, respectively.

Alternatively or in addition, when the battery power supply unit is removably held in said compartment or in said container, respectively, sealing means between the battery power supply unit and said compartment or said container, respectively, are preferably provided for.

The battery power supply unit can be removably held in said compartment or in said container, respectively, through a strap, in particular when there are such laterally projecting wall and such sealing means.

Preferably said strap is configured to exert a thrust on the battery power supply unit towards the compartment.

Preferably, on the bottom of said compartment or of said container, respectively, an elastic element is also provided for, configured to bias the battery power supply unit in the exiting direction from the compartment or from the container, respectively.

Alternatively or in addition, preferably, a threaded coupling is provided between the battery power supply unit and the compartment or the container, respectively, more preferably on the bottom of said compartment or of said container, respectively.

Preferably, at least said one of the inner connecting rod and the outer connecting rod is made of composite material comprising a polymeric matrix with reinforcing fiber.

More preferably, in such a case at least said one of the inner connecting rod and the outer connecting rod comprises a metallic reinforcing element.

Preferably, when the container is fixed to said one of the inner connecting rod and the outer connecting rod through co-moulding, the container is made of plastic material and said one of the inner connecting rod and the outer connecting rod is made of metallic material.

The derailleur preferably comprises a battery power supply unit management circuit.

Preferably, the battery power supply unit is a smart battery including said management circuit.

The derailleur preferably further comprises a charging circuit for providing a charging voltage and/or current with controlled intensity over time to the battery power supply unit.

Preferably, a charging port provided for the removable connection of the battery power supply unit to a battery charger or to a cable.

This provision has a particularly advantageous application when the battery power supply unit is supported by said one of the inner connecting rod and the outer connecting rod in a non-ordinarily removable manner, however the charging port can also be provided in the other cases.

Preferably, the charging port is supported onto and faces from the support body.

In other embodiments, the charging port can be supported onto and face from the connecting rod on which the battery power supply unit is supported.

Furthermore, the charging port can be supported onto and face from the movable body, preferably from the chain guide.

Preferably, the charging port is of the USB type.

Preferably, the derailleur comprises a wireless communication circuit for the communication of data and commands with other components of an electronic gearshift of a bicycle.

Preferably, the derailleur comprises a driving circuit for the electric motor.

Preferably, the electric rear derailleur further comprises an electric motor or a geared motor comprising an electric motor, which controls the linkage to displace the chain guide among the toothed wheels.

Typically, the motor is coupled with a gear reduction mechanism to form a geared motor.

The gear reduction mechanism typically comprises a gear train.

Preferably, an output shaft of the electric motor, or of a geared motor which it is part of, defines an articulation axis of the articulated parallelogram linkage.

This configuration is preferable to a configuration in which the electric motor is arranged along the diagonal of the articulated parallelogram, because it allows more space to arrange the battery power supply unit on the connecting rod, and allows the spaces to be exploited in the best way.

More preferably, the articulation axis is one of the articulation axes of said one of the inner connecting rod and the outer connecting rod, namely of the connecting rod that supports the battery power supply unit.

Alternatively, the electric motor could be arranged along the diagonal of the articulated parallelogram.

Preferably, the battery power supply unit is provided for the power supply of the electric motor and/or of at least some electric or electronic components of the derailleur.

Among the electronic components of the derailleur, typically there are provided: the aforementioned driving circuit for the electric motor, a control circuit for the derailleur, a circuit for communication with the remaining components of a bicycle electronic gearshift, an optional management circuit for the battery power supply unit itself, a microcontroller for supervision of the various aforementioned circuits, etc.

Preferably, the motor and/or at least part of the electric/electronic components powered by the battery power supply unit are fixedly supported on the support body.

In such a case, preferably a flexible cable connects the compartment or container housing the battery power supply unit, and the support body.

Such a power supply cable need only allow the short stroke of the connecting rod on which the battery power supply unit is supported, of the order of a centimeter.

Preferably, the battery power supply unit comprises a pair of negative and positive electric contacts, a track of the negative electric contact being made longer than a track of the positive electric contact.

Figure 2:
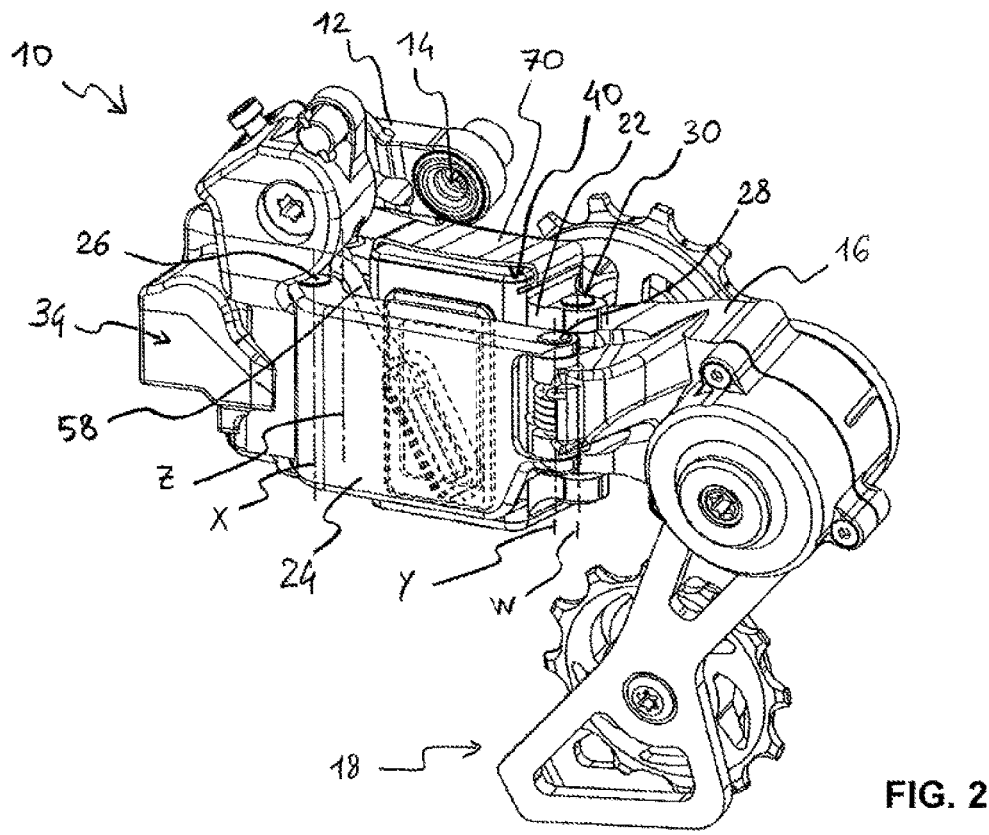
FIG. 2 is a perspective view of an electric rear derailleur according to a first embodiment of the invention.
Figure 4:
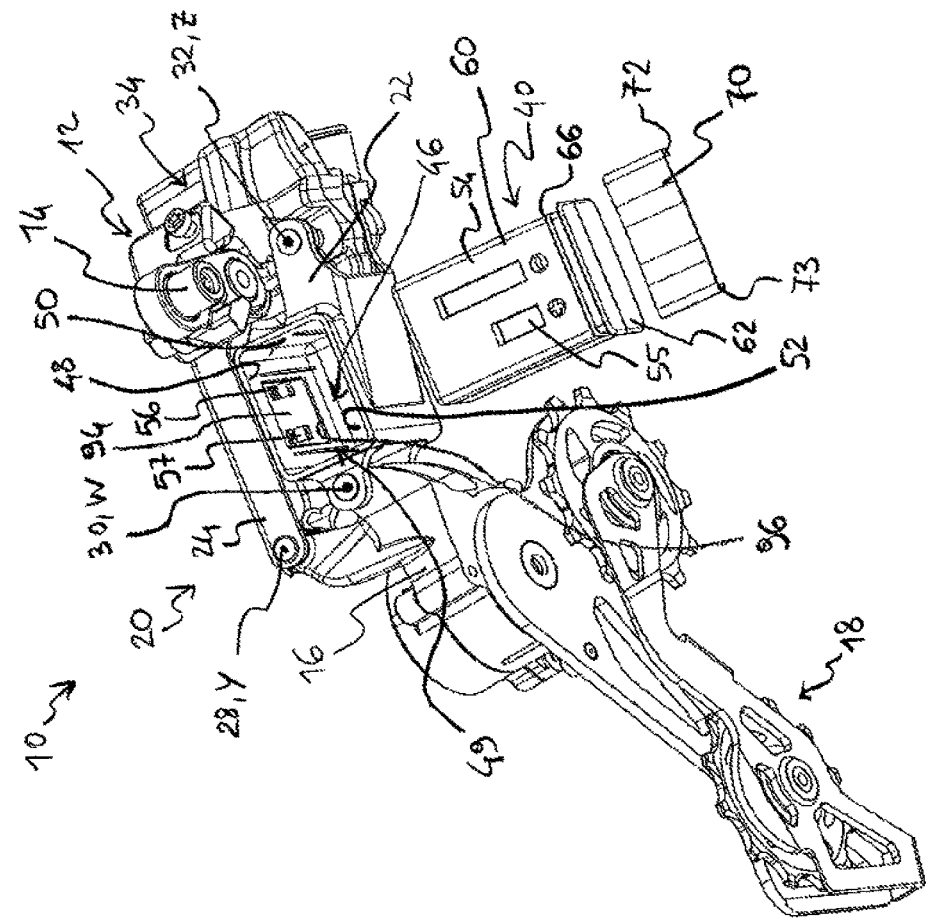
FIGS. 3 and 4 are perspective top views of the derailleur, with a battery power supply unit seated and extracted, respectively.
Figure 3:
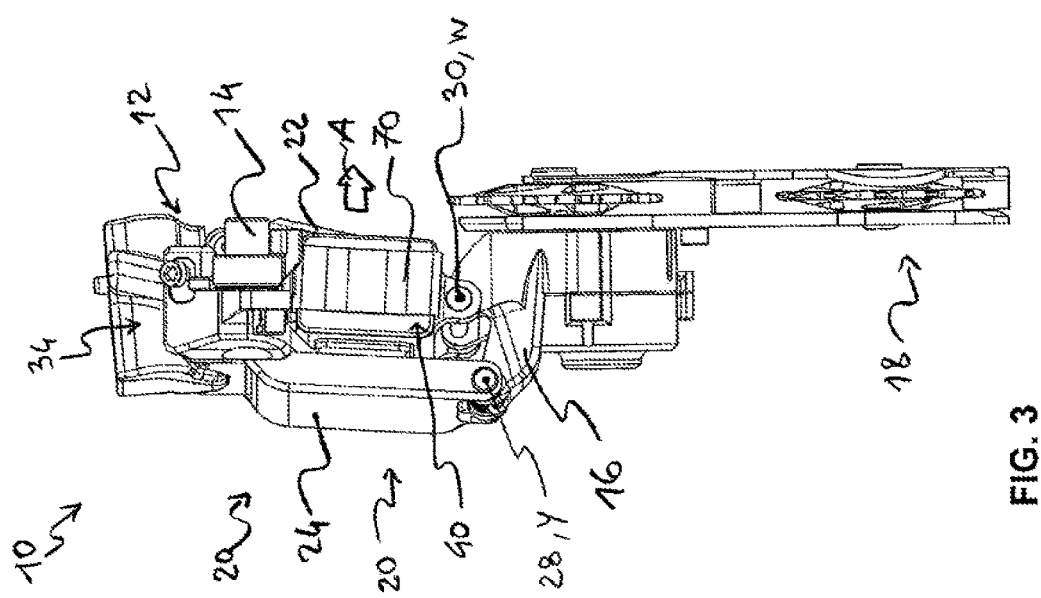
Figure 5:
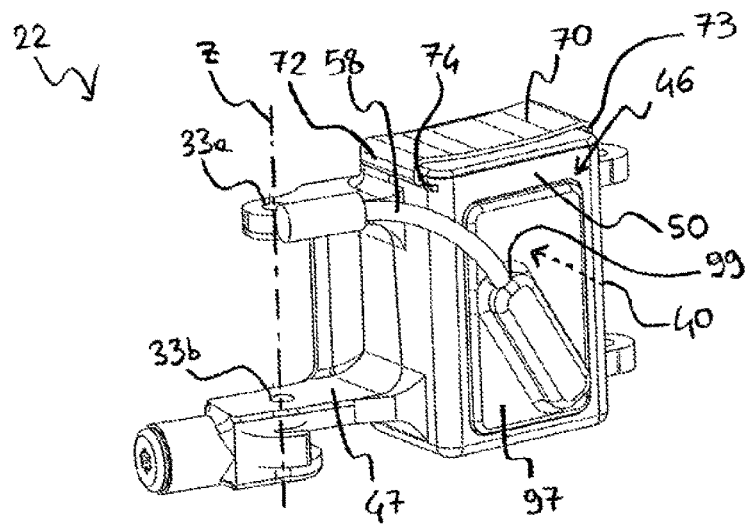
FIG. 5 is a perspective view of a connecting rod of the derailleur, with the battery power supply unit seated.

With reference now to FIGS. 2-8 and in particular first to FIGS. 2-4, an electric rear derailleur 10 of an electronic gearshift according to a first embodiment of the invention is described.

The electric rear derailleur 10 comprises in general a support body 12 configured to be mounted on the frame 1109 of the bicycle 1100 through per se well known means generically indicated with 14, a movable body 16 comprising a chain guide or rocker arm 18, and a linkage 20 that connects the movable body 16 to the support body 12 so that the movable body 16 can be displaced among the sprockets 1103 associated with the rear wheel 1106 of the bicycle 1100.

The movable body 16 is connected to the support body 12 through two connecting rods or arms, respectively indicated as inner connecting rod 22 and outer connecting rod 24.

The linkage 20 that connects the movable body 16 in a displaceable manner with respect to the support body 12 is of the articulated parallelogram type, and comprises the two connecting rods 22, 24, each articulated, at opposite ends, respectively to the support body 12 and to the movable body 16.

More in particular, the outer connecting rod 24 is pivotally coupled to the support body 12 about a rotation axis X defined by an idle pin 26 and is pivotally coupled to the movable body 16 about a rotation axis Y defined by an idle pin 28. The inner connecting rod 22 is pivotally coupled to the movable body 16 about a rotation axis W defined by a pin 30. In the various cases, instead of a single idle pin there can be a pair of coaxial pins.

The inner connecting rod 22 is, finally, pivotally coupled to the support body 12 about a rotation axis Z that is defined by an output shaft 32 of a geared motor housed within the support body 12 as generically indicated by reference numeral 34. In such a way, the inner connecting rod 22 is directly driven into rotation by the geared motor 34, so that the articulated parallelogram linkage 20 and the geared motor 34 embody the electromechanical actuator.

The electric rear derailleur 10 further comprises a battery power supply unit 40 for supplying the necessary power supply to the electric motor of the geared motor 34 and/or to a driving circuit thereof, and/or to other electric/electronic components of the derailleur 10 itself or more generally of the bicycle 1100.

Preferably, such electric/electronic components of the derailleur 10 include a communication circuit for the communicating data and commands with other components of the bicycle electronic gearshift which the electric rear derailleur 10 is part of, in particular for receiving gearshifting request signals from the manual control devices 1107.

Preferably, the communication circuit is of the wireless type, for example according to the Bluetooth® protocol.

Preferably, such electric/electronic components of the derailleur 10 further include a microcontroller for the supervision of the various aforementioned circuits.

When in particular the battery power supply unit 40 also powers the electric motor of the geared motor 34 and moreover, the communication circuit is wireless, the electric rear derailleur 10 turns out to be advantageously stand-alone, and it is not necessary to provide any data/power supply connection cable with the rest of the electronic gearshift 1110.

In the derailleur 10 there can also be a sensor or transducer of the position, speed, acceleration and/or direction of rotation, of the rotor of the motor of the geared motor 34 or of any movable part downstream of the rotor, down to the chain guide 18 itself, to verify when the intended position has been reached by the chain guide 18 or more generally to provide a feedback on the position of the chain guide 18 during the use of the electronic gearshift.

The battery power supply unit 40 comprises one or more secondary or rechargeable batteries.

According to the invention, the battery power supply unit 40 is supported by one of the connecting rods 22, 24 of the linkage 20 of the rear derailleur 10, in the case shown and in a preferred manner by the inner connecting rod 22.

In this way, it is better protected against impacts and less visible. Moreover, in the mounted condition of the derailleur 10, the battery power supply unit 40 is advantageously housed between the outer connecting rod 24 and the frame 1109 of the bicycle 1100, and therefore it has a smaller effective occupied space and less aerodynamic impact.

In such a position, moreover, the battery power supply unit 40 advantageously occupies what would otherwise be a dead space, thus improving the compactness of the rear derailleur 10.

The battery power supply unit 40 preferably extends mainly inside the articulated parallelogram of the linkage 20. In particular, the battery power supply unit 40 extends mainly between the plane defined by the articulation axes Z, X of the connecting rods 22, 24 to the support body 12, and the plane defined by the articulation axes W, Y of the connecting rods 22, 24 to the movable body 16. Moreover, the battery power supply unit 40 extends mainly between the plane defined by the two articulation axes Z, W of the inner connecting rod 22, and the plane defined by the two articulation axes X, Y of the outer connecting rod 24.

The battery power supply unit 40 is housed in a compartment 46 or recessed seat, made in the inner connecting rod 22. The compartment 46 is directly made in the inner connecting rod 22, and in other words forms a container made as one piece or monolithically made with the connecting rod, as highlighted in the view of FIG. 5.

The inner connecting rod 22 has therefore a large volume and therefore, in order to keep the weight thereof low, it is preferably made of a plastic material, typically a composite material comprising a polymeric matrix reinforced with fiber. However, in other embodiments, the inner connecting rod 22 can be made of metal.

However, because it has to transfer large loads, preferably the inner connecting rod 22 is provided with a metallic reinforcement 47, for example made of stainless steel. The reinforcement 47 shown is in the form of a sheet bent into the shape of a U and extending adjacent to the compartment 46 and about the regions 33a, 33b of the connecting rod 22 for coupling with the output shaft 32 of the geared motor 34, defining the axis Z.

The compartment 46 has a shape substantially matching that of the battery power supply unit 40.

Figure 7:
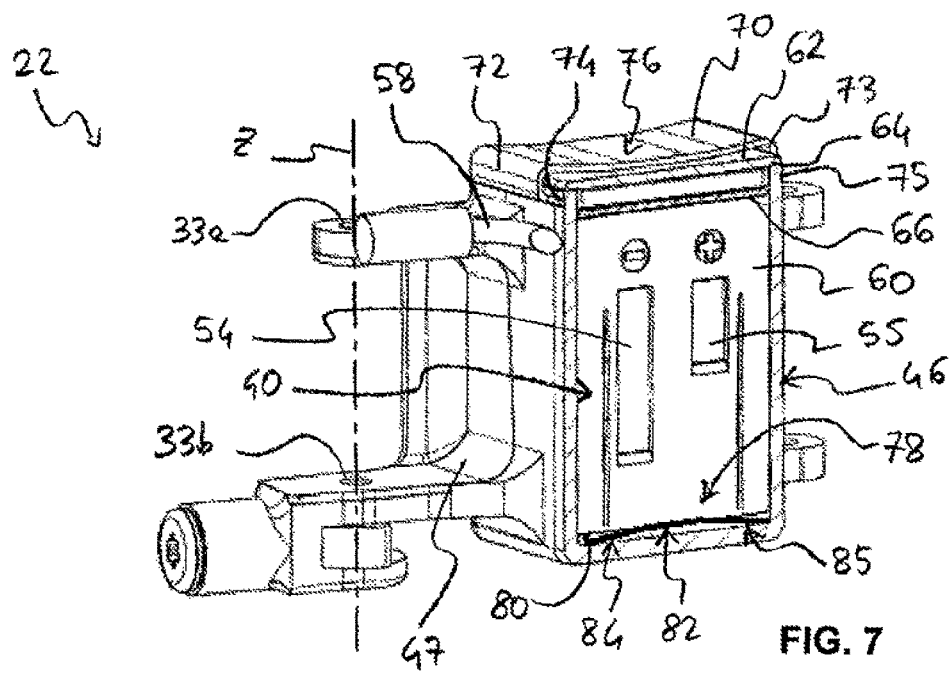
FIG. 7 is a cross-sectional view of the connecting rod of the derailleur, with the battery power supply unit seated.

The compartment 46 comprises a mouth 48 suitably sized for the seating and extraction of the battery power supply unit 40 through a linear sliding movement, for example determined by guides formed by grooves 41 and ribs 49 visible in FIGS. 4 and 7, as well as a side wall 50 and a bottom wall 52 opposite to the mouth 48.

The mouth 48 of the compartment 46 is positioned so as to be accessible with mounted linkage 20. In this particular case, the mouth 48 of the compartment 46 is advantageously positioned on the face of the inner connecting rod 22 that in use of the derailleur 10 is substantially the uppermost, so that the battery power supply unit 40 is held up by gravity by the bottom wall 52 of the compartment 46. However, other positions are possible, for example on the opposite face of the inner connecting rod 22, so that the entrance of dirt and water into the compartment 46 would be reduced, or yet on the inner face of the inner connecting rod 22. In principle, the mouth 48 of the compartment 46 could be formed on the outer face of the inner connecting rod 22, wherein the extraction of the battery power supply unit 40 can occur when the linkage 20 is in the open-parallelogram condition.

In the case of compartment 46 on the outer connecting rod 24, the mouth will preferably be on the upper, lower or outer face, but it could also be on the inner face of the outer connecting rod 24, wherein the extraction of the battery power supply unit 40 can occur when the linkage 20 is in the open-parallelogram condition.

A pair of electric contacts 54, 55 of the battery power supply unit 40, in its condition inserted in the compartment 46, contacts a pair of electric contacts 56, 57 that face the compartment 46, in turn connected through a cable 58 to the users—in the case shown to the geared motor 34, so as to embody the electrical connection of the battery power supply unit 40 to the derailleur 10.

In the embodiment shown, the contacts 54, 55 comprise elongated tracks made on the side wall 60 of the battery power supply unit 40.

The track of the negative contact 54 of the battery power supply unit 40 is made longer than the track of the positive contact 55 thereof. The electric contacts 56, 57 of the compartment 46 are cantilever plates placed at the same insertion depth as the battery power supply unit 40. In this way, during the insertion of the battery power supply unit 40, the negative contact 54 of the battery power supply unit 40 advantageously contacts the corresponding negative contact 56 of the compartment 46 before the positive contact 55 of the battery power supply unit 40 contacts the corresponding positive contact 57 of the compartment 46, thus avoiding the formation of sparks and voltage peaks and thus protecting the battery power supply unit 40 and the users thereof during the electrical connection.

The battery power supply unit 40 is removably held within the compartment 46 of the inner connecting rod 22, in the manner better described hereinafter. As defined above, under "removable" it is meant to be indicated that it is possible to disconnect the battery power supply unit 40 from the compartment 46 of the inner connecting rod 22 without breaking or damaging either one.

Thanks to the provision of a mouth 48 of the compartment 46 accessible with mounted linkage 20, and to the provision of means for removable holding of the battery power supply unit 40 in the compartment 46, the battery power supply unit 40 is supported by the inner connecting rod 22 in an ordinarily removable manner, in the aforementioned meaning.

Figure 6:
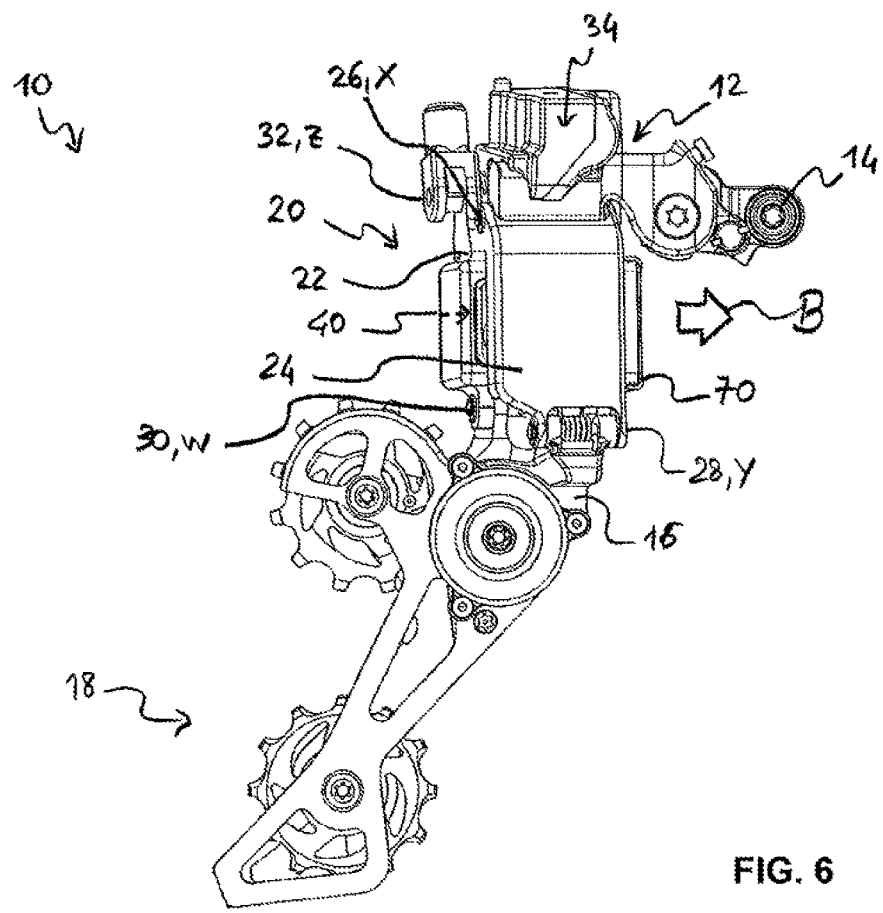
FIG. 6 is a side view of the derailleur, in a maximum open condition thereof.

FIG. 6 illustrates that it may be necessary to "open" to the maximum extent the derailleur 10, namely to bring it towards the outermost sprocket of the cogset 1103—i.e. the smallest one—so as to rotate the connecting rod 22 on which the battery power supply unit 40 is supported into a suitable position with respect to the means 14 for fixing the derailleur 10 to the frame 1109, in order to allow the insertion and removal of the battery power supply unit 40; this operation is in any case of the "ordinary" type in the aforementioned meaning.

Figure 8:
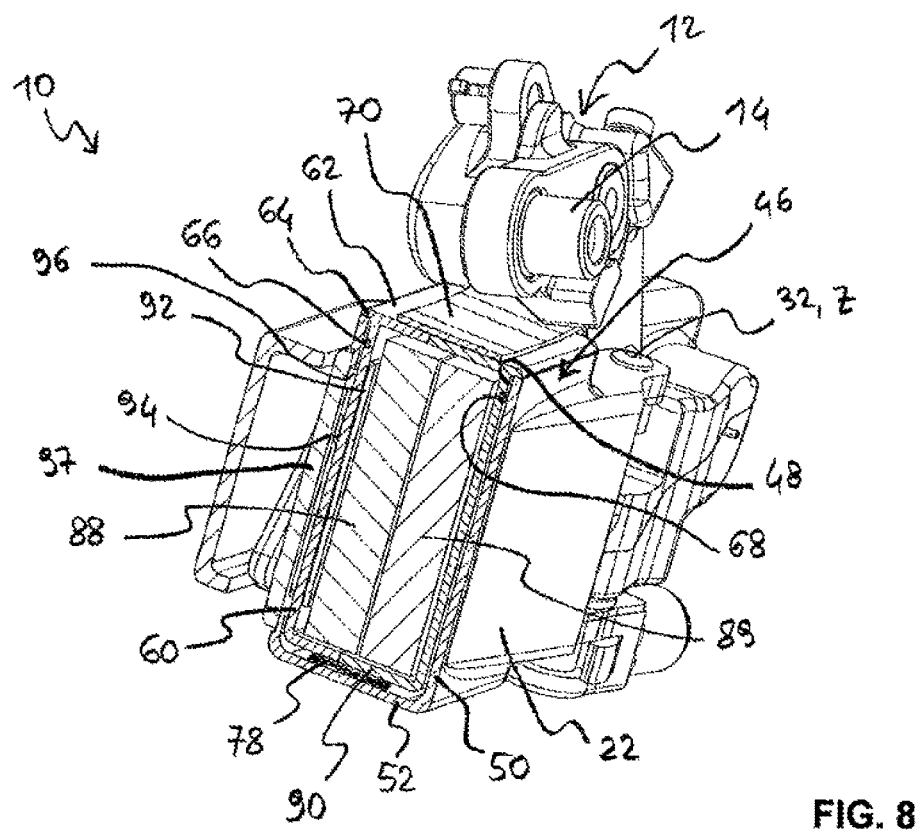
FIG. 8 is a partial view of the derailleur, with the battery power supply unit seated, in a section through the connecting rod according to a plane perpendicular to that of FIG. 7.

As highlighted by FIGS. 7-8, a wall 62 of the battery power supply unit 40 projects, preferably and as shown, beyond its side wall 60 so as to form a laterally projecting edge 64. When the battery power supply unit 40 is seated in the compartment 46, its laterally projecting edge 64 abuts on the mouth 48 of the compartment 46. Therefore, the projecting wall 62 of the battery power supply unit 40 also acts as a lid for the compartment 46 of the inner connecting rod 22, when the battery power supply unit 40 inserted, defining the end of stroke position of the latter, and preventing impurities from soiling and wetting the electric contacts 54-57. It is not strictly necessary for the laterally projecting edge 64 to extend all around the mouth 48 of the compartment 46.

The battery power supply unit 40 is, alternatively or in addition, advantageously provided with a sealing element 66. In the case shown, such a sealing element 66 is an O-ring, housed in a suitable perimeter groove 68 in the side wall 60 of the battery power supply unit 40 so as to seal onto the side wall 50 of the compartment 46 in the inserted condition of the battery power supply unit 40.

The sealing element 66 serves the purpose of preventing impurities from soiling and wetting the electric contacts 54-57; moreover, it can play a role in holding the battery power supply unit 40 in the compartment 46.

Alternatively, the sealing element 66 could be arranged between the laterally projecting wall 62 and the mouth 48 of the compartment 46.

In order to hold—or further hold—the battery power supply unit 40 in the seated condition, and in particular to prevent it from coming out from the compartment 46, a strap 70 is advantageously provided for secured to the inner connecting rod 22 astride the mouth 48 of the compartment 46, preferably with the interposition of the laterally projecting edge 64 of the battery power supply unit 40, when provided for.

In particular, such a strap 70 has two opposite longitudinal ends bent to form two flaps 72, 73 extending towards one another. On the inner connecting rod 22, close to the mouth 48 of the compartment 46, two grooves 74, 75 for the flaps 72, 73 are made, which are open at at least one respective longitudinal end so as to also act as a sliding guide for the flaps 72, 73. In order to lock the battery power supply unit 40, one of the two flaps 72, 73 is placed in the corresponding groove 74, 75 and the other of the two flaps 72, 73 is snapped in the other one of the grooves 74, 75; in order to unlock the battery power supply unit 40, the strap 70 is removed by pushing it in the direction parallel to the sliding guides 74, 75 (cf. arrow A in FIG. 3) until it has totally come out of them. Alternatively, the locking of the strap 70 can also occur by sliding and/or the unlocking can occur by snapping. The strap 70 is sufficiently elastic to allow the movements described above.

Yet alternatively, the strap 70 could be replaced by a lid having a rim extending along the entire perimeter thereof, able to be snap-locked into a perimeter groove made on the inner connecting rod 22, close to the mouth 48 of the compartment 46.

The strap 70 has an inflected portion 76 in the middle, the convexity of which faces towards the bottom wall 52 of the compartment 46, and thus towards the battery power supply unit 40.

The strap 70 can comprise such an inflected portion 76 in a preconfigured manner, namely also when the strap 70 is not secured to the inner connecting rod 22 in the aforementioned manner. Alternatively, the strap 70 can be configured to inflect, so as to form such an inflected portion 46, only when it is secured to the inner connecting rod 22.

Such an inflected portion 76 of the strap 70 exerts a thrust on the battery power supply unit 40 towards the compartment 46, until laterally projecting edge 64 thereof abuts on the mouth 48 of the compartment 46, even if the orientation of the mouth 48 is not such as to exploit the force of gravity for this purpose.

The battery power supply unit 40 is further provided with an elastic element 78. Such an elastic element 78 is in particular fixed on the wall 80 thereof opposite to the laterally projecting wall 62 and that in use faces the bottom wall 52 of the compartment 46. The elastic element 78 is compressed when the battery power supply unit 40 is seated.

In the embodiment shown, the elastic element 78 is a flat spring having a central portion 82 suitably fixed—for example screwed or glued—to the battery power supply unit 40, and flexing flaps 84, 85. On the bottom wall 52 of the compartment 46 two abutments (not visible) can be provided, defining an end of stroke for the flexing flaps 84, 85 of the spring 66.

The combination of thrust exerted on one side by the inflected portion 76 of the strap 70 and thrust reaction on the other side exerted by the elastic element 78, allows the position of the battery power supply unit 40 to be fixed, and the vibrations to which the latter is subjected when it is inserted in the compartment 46 to be dampened, still preserving the effective electric contact between the contacts 54, 55 of the battery power supply unit 40 and the respective contacts 56, 57 made in the compartment 46.

The elastic element 78 has the further function of pushing the battery power supply unit 40 in the exiting direction from the compartment 46 (cf. arrow B in FIG. 6) therefore facilitating the extraction thereof when the strap 70 is removed.

Alternatively, a substantially flat strap 70 having a pressure projection could be provided. Furthermore, a strap having a pressure spring could be provided, in this case the elastic element 78 could be absent, the extraction of the battery power supply unit 40 occurring by pulling it from its projecting edge 64.

In addition, an elastic element acting on the face of the battery power supply unit 40 opposite the one where the contacts 54, 55 are could be provided for, to ensure the contact thereof with the contacts 56, 57 of the compartment 46.

Yet alternatively, the contacts 56, 57 could be provided on the bottom wall 52 of the compartment 46, opposite the mouth 48—and the contacts 54, 55 in a corresponding position on the battery power supply unit 40—and in such a case a single elastic element could perform all of the aforementioned functions.

As stated, the battery power supply unit 40 comprises one or more secondary or rechargeable batteries, for example lithium ion batteries. FIG. 8 shows two batteries 88, 89 wrapped by a casing 90.

Preferably, the battery power supply unit 40 is a so-called smart battery and therefore the casing 90 houses inside, besides the batteries 88, 89, a printed circuit board (PCB) 92 carrying components that make a management circuit for the battery power supply unit 40.

Such a management circuit, per se known, typically includes a temperature sensor and emits an alarm signal when the temperature exits a predetermined temperature range and/or an approval signal for charging and/or for use when the temperature falls within one or a respective predetermined temperature range. Alternatively and/or in addition, such a management circuit can monitor the voltage and/or current of the battery(-ies) that form the battery power supply unit 40, emitting an alarm signal in case of values exiting the predetermined ranges. The alarm signal can lead to the electrical insulation of the battery power supply unit 40 from the rest of the electric circuit of the derailleur 10, in order to protect the relative components thereof, also according to the current regulations. Furthermore, the management circuit can monitor the residual charge, count the charging cycles, etcetera.

The arrangement of the board 92 carrying the management circuit within the same casing 90 as the battery(-ies) 88, 89, and in particular in close contact therewith, is advantageous because the temperature detected by the temperature sensor provides an accurate indication of the instantaneous temperature of the battery(-ies) 88, 89 itself/themselves.

The board 92 also carries the aforementioned contacts 54, 55.

The cable 58 carries data signals that are exchanged between the smart battery formed of the battery power supply unit 40 and the management circuit thereof, and the remaining electric/electronic components housed in the support body 12, for example information on the detected temperature or on the residual charge of the smart battery.

The cable 58 therefore extends up to the support body 12 and is sufficiently flexible and long so as to allow the short stroke of the inner connecting rod 22.

FIG. 8 also shows a second printed circuit board 94 carrying, on a first face, the aforementioned contacts 56, 57 and, on the opposite face, the aforementioned cable 58. The portion of the second board 94 carrying the contacts 56, 57 faces towards the compartment 46 in a suitable window 96 (see also FIG. 4), and the second board 94 is held around the window 96 through a panel 97 provided with a hole 99 (FIG. 5) from which the cable 58 comes out. The panel 97 made as one piece with the inner connecting rod 22 for example through co-molding, gluing, riveting.

From the above description it is clear that the battery power supply unit 40 of the embodiment described above with reference to FIGS. 2-8 is removably held within the compartment 46 of the inner connecting rod 22.

Figure 9:
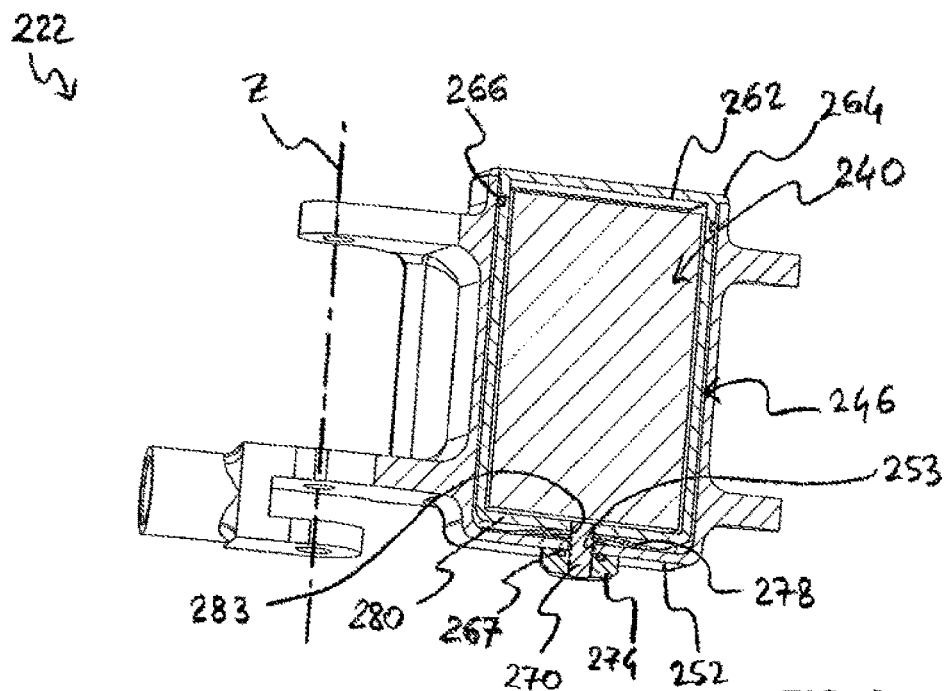
FIG. 9 is a cross-sectional view of a connecting rod according to a second embodiment of the invention, with the battery power supply unit seated.
Figure 10:
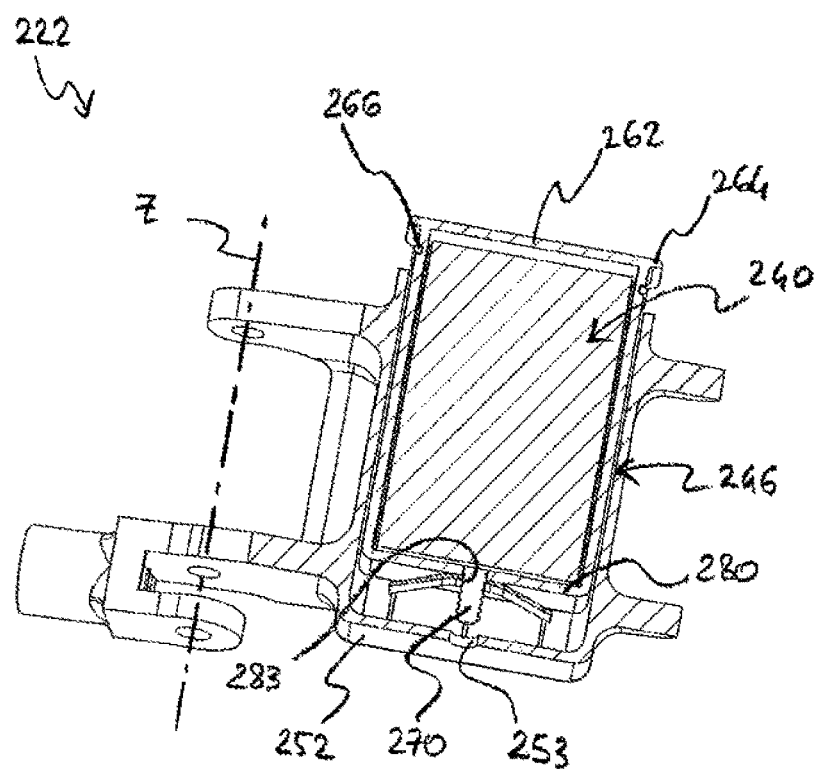
FIG. 10 is a cross-sectional view of the connecting rod according to the second embodiment of the invention, with the battery power supply unit in a temporary condition of partial seating.

FIGS. 9-10 show a second embodiment of the invention, which will be described hereinafter only in what differs from the previous one.

In this case, the means for removably holding the battery power supply unit 240 in the compartment 246 of the inner connecting rod 222 comprise a threaded coupling.

A threaded pin 270 projects from the wall 280 of the battery power supply unit 240 opposite the laterally projecting wall 262 and that in use faces the bottom wall 252 of the compartment 246. An opening 253 for passage of the threaded pin 270 is formed in the bottom wall 252 of the compartment 246 of the inner connecting rod 222 in a suitable position. When the battery power supply unit 240 is inserted in the compartment 246 of the inner connecting rod 222, the threaded pin 270 passes through the opening 253, projecting outside of the compartment 246. A nut 274 is also provided, that is screwed onto the threaded pin 270 outside of the compartment 246, fixing therefor the battery power supply unit 240 in the compartment 246 of the inner connecting rod 222. The nut 274 is tightened until the laterally projecting edge 264 of the laterally projecting wall 262 of the battery power supply unit 240 abuts around the mouth 248 of the compartment 246, namely until the battery power supply unit 240 is fully inserted in the compartment 246 and, consequently, the compartment 246 is closed. The tightened closure is once again ensured by a sealing element 266, analogous to the one described for the previous case. Moreover, there can be a sealing element 267 at the threaded coupling.

In greater detail, the threaded pin 270 projects through a suitable opening 283 formed in the central portion 282 of the elastic element 278, which is otherwise unchanged. The screwing of the nut 274 pulls the battery power supply unit 240 against the force of the elastic element 278, compressing it. When the nut 274 is released, the elastic element 278 decompresses, pushing the battery power supply unit 240 in the exiting direction from the compartment 246, therefore facilitating the extraction thereof in an analogous manner to the first embodiment. However, also in the case of the second embodiment, the elastic element 278 could be omitted, the extraction of the battery power supply unit 240 occurring by pulling it from its laterally projecting edge 264.

The threaded coupling fixing could occur, in a less preferred manner, on a different wall of the compartment, by providing an internally threaded hole on the battery power supply unit and a threaded element screwed into such hole from outside of the compartment.

Moreover, also in the case of the second embodiment there could be an elastic element acting in the direction of contact of the electric contacts 54-57 and/or a single elastic element that performs all of the aforementioned functions, through a suitable positioning of the electric contacts 54-57.

Figure 11:
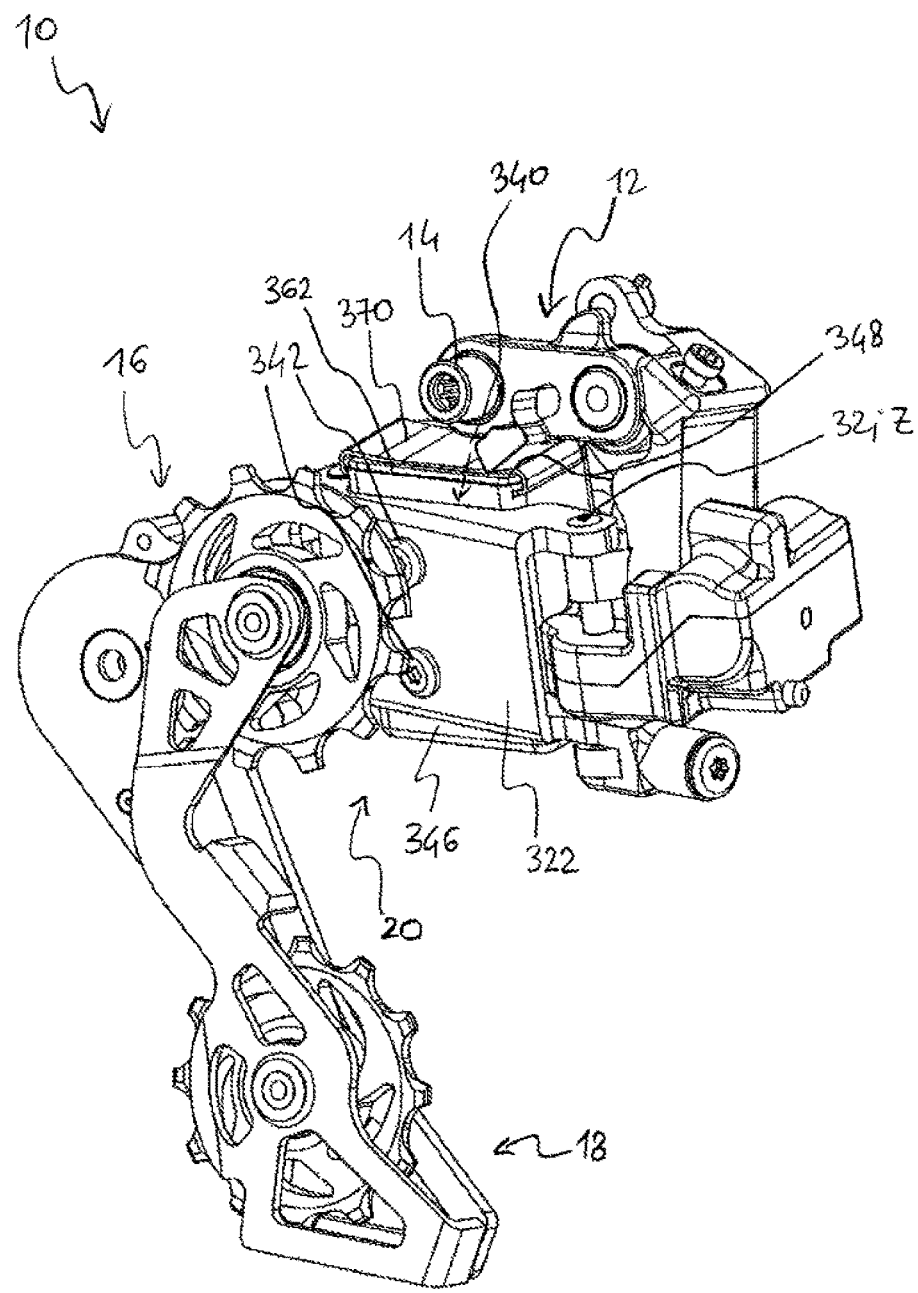
FIG. 11 is a perspective view of an electric rear derailleur according to a third embodiment of the invention.

FIG. 11 illustrates a third embodiment of the invention, which differs from the previous ones in that it provides for a container 346 of the battery power supply unit 340, which container 346 is supported by the inner connecting rod 322, but is separate and distinct from the inner connecting rod 322.

The container 346 is shown fixed to the outer face of the inner connecting rod 322, so that, with the aforementioned advantages, the battery power supply unit 340 is housed between the outer connecting rod 24 and the frame 1109 of the bicycle 1100, inside the articulated parallelogram of the linkage 20 and in particular between the planes defined by the articulation axes Z, X and W, Y, respectively, as well as between the planes defined by the articulation axes Z, W and X, Y, respectively.

The container 346 is shown fixed to the outer face of the inner connecting rod 322, however it could be fixed to the inner, upper or lower face of the inner connecting rod 322. Also in the case of fixing to the outer connecting rod 24, the container 346 could be fixed in general on any of the faces thereof, but preferably it will be fixed on the inner face of the outer connecting rod 24.

In the case shown, the container 346 is fixed to the inner connecting rod 322 in a removable manner. Merely as an example, the fixing means are screws 342 that cross the inner connecting rod 322 at suitable openings and screw into the container 346 of the battery power supply unit 340. Alternatively, the container 346 could be fixed to the inner connecting rod 322 through different types of removable coupling, such as for example through snap coupling, shape fitting, force fitting, etcetera.

In the case shown, the battery power supply unit 340 is removably held in the container 346 through a strap 370 in a completely analogous manner to the manner in which the battery power supply unit 40 is removably held in the compartment 46. Concerning the positioning of the mouth 348 of the container 346, all of the generalizations outlined above regarding the mouth 48 of the compartment 46 hold true.

The battery power supply unit 340 is unchanged with respect to the battery power supply unit 40 of the first embodiment, and the container 346 is internally configured in an analogous manner to the compartment 46 of the first embodiment. In particular, as described in relation to the first embodiment, the closure of the container 346 is ensured by the laterally projecting wall 362 and possibly by a sealing element (not shown).

Alternatively, the battery power supply unit 340 could correspond to the battery power supply unit 240 of the second embodiment, and the container 346 could be internally configured in an analogous manner to the compartment 246 of the second embodiment; all of the generalizations outlined above regarding such embodiments hold true.

It should be noted that the battery power supply unit 340 is not only ordinarily removable from the derailleur 10 through extraction from the container 346, typically for charging thereof, but it is furthermore removable from the derailleur 10 thanks to the possibility of separating the container 346 from the inner connecting rod 322 without the need to dismount the entire inner connecting rod 322, typically for extraordinary or less ordinary operations. For example, the container 346 can be separated from the inner connecting rod 322 due to breaking thereof and/or oxidation or breaking of the electric contacts inside it. During maintenance or replacement, the linkage 20 advantageously stays intact. It is also possible to replace the container 346 only, without the need to replace the entire inner connecting rod 322. It should be noted that to dismount the container 346 from the inner connecting rod 322 it might be necessary to bring the linkage 20 into a maximum-opening position.

Since these are extraordinary maintenance operations, as stated above, and therefore typically under the responsibility of a workshop or specialized workers, it is not necessary for the coupling means between the container 346 and the inner connecting rod 322 to be easily maneuverable, by type and/or position. On the contrary, by providing that such coupling means between the container 346 and the inner connecting rod 322 are not easily accessible and maneuverable, an intervention by the user of the bicycle 1100 is discouraged.

The container 346 could also be fixed to the inner connecting rod 322 in a fixed or irremovable manner, preferably through co-moulding, or at least in a semi-permanent manner, such as for example by riveting, gluing, welding, etcetera. In the latter case, the aforementioned advantages still exist, although to a lesser extent; it may still be possible to replace the container 346 only, without replacing the whole inner connecting rod 322.

It should also be noted that, since these are extraordinary maintenance operations, it is not necessary for the electrical connection through the cable 58 to have a pair of removable connectors, because during replacement of the container 346 it is possible to take care of re-welding the electrical conductors. However, such a pair of removable connectors can be provided for, for example on the side of the support body 12.

Advantageously, the container 346 can be made of a different material than that of the inner connecting rod 322, more suitable for its purpose.

In particular, in case the container 346 is fixed to the inner connecting rod 322 through co-molding, the inner connecting rod 322 is preferably made of metallic material and the container 346 is preferably made of plastic material.

Figure 12:
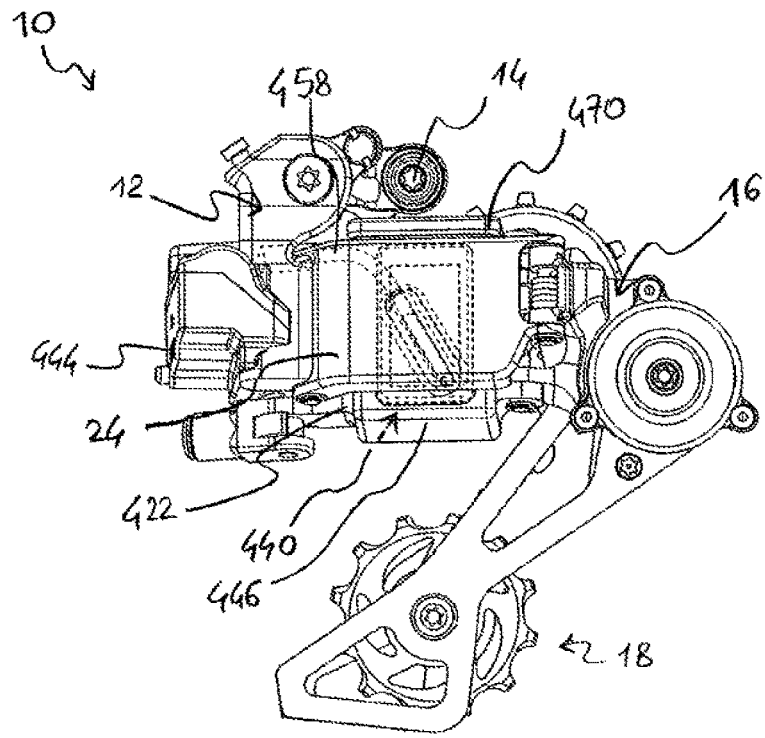
FIG. 12 is a perspective view of an electric rear derailleur according to a fourth embodiment of the invention.
Figure 13:
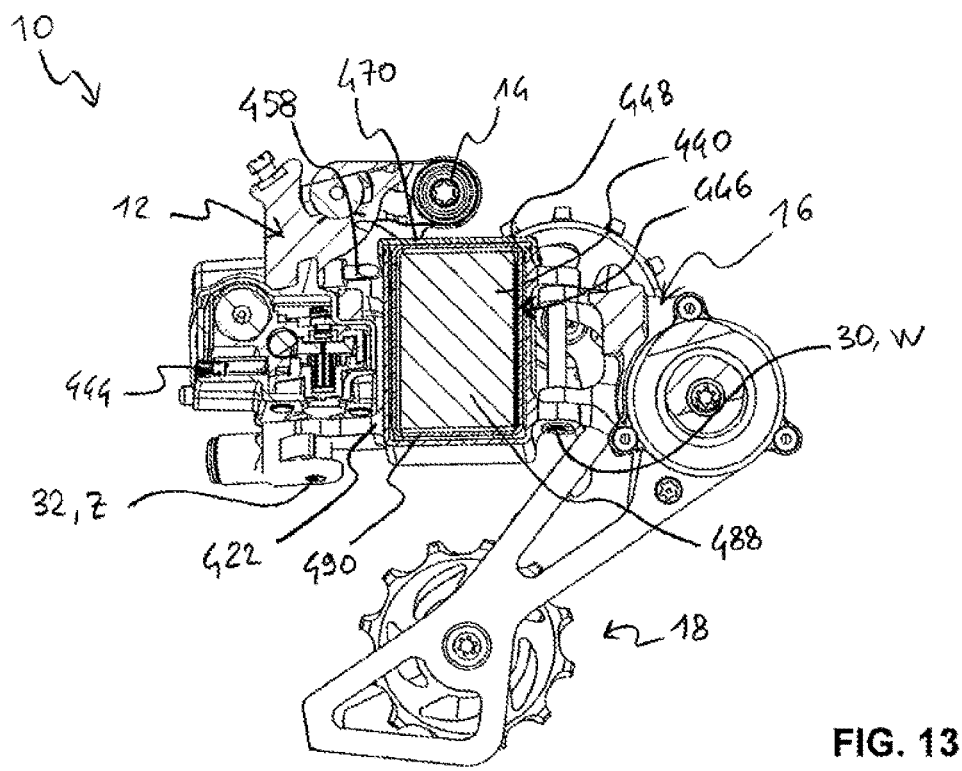
FIG. 13 is a front view of the derailleur of FIG. 12, with a cross-section at the battery power supply unit.

FIGS. 12-13 show a fourth embodiment of the invention, which differs from the previous ones mainly in that the battery power supply unit 440 is not ordinarily removable from the derailleur 10.

The battery power supply unit 440 is housed in a compartment 446 or recessed seat, made in the inner connecting rod 422, in an analogous manner to the first and the second embodiments. The compartment 446 is however, in this case, firmly closed. In the case shown, the compartment 446 is closed through a lid 470 fixed onto the mouth 448 of the compartment 446 in a fixed or irremovable manner or at least in a semi-permanent manner, for example through gluing, welding, riveting, etcetera.

The battery power supply unit 440 is completely inserted in the compartment 446 and therefore lacks the laterally projecting edge 64 of the battery power supply unit 40 of the first embodiment.

The closure of the compartment 446 is preferably made in a sealed manner. For such a reason, the sealing element 66 of the battery power supply unit 40 of the first embodiment is also absent. If, on the other hand, the closure of the compartment 446 is not sealed, such a sealing element 66 could be provided for, the generalizations outlined above in respect thereto holding true.

It is also not strictly necessary, although possible, for the battery power supply unit 440 to have a casing 490 of the sealed type that encloses its secondary battery(-ies) (one of which can be seen and is indicated with reference numeral 488) and the possible PCB; indeed, the casing 490 could even be absent.

The electrical connection of the battery power supply unit 440 can occur through welded conductors instead of through the contacts 54-57.

Moreover, because the frequent extraction of the battery power supply unit 440 from the compartment 446 is not intended, the elastic element 78, 278 for biasing towards the mouth of the compartment 446 is absent. However, nothing prevents it to be provided for anyway, for example in order to facilitate the extraction of the battery power supply unit 440 to the technical maintenance workers.

The battery power supply unit 440 is not ordinarily removable from the derailleur 10.

The battery power supply unit 440 is extraordinarily removable from the derailleur 10, typically for extraordinary or less ordinary operations such as in the case of breaking or malfunctioning of the battery power supply unit 440. However, it is necessary to dismount the linkage 20 and replace the whole inner connecting rod 422.

In principle, with suitable provisions it is also possible to only un-weld the cover 470 and thus remove the battery power supply unit 440 from the compartment 446 without dismounting the linkage 20. In order to perform this operation it may be necessary to "open" the derailleur 10 in an analogous manner to what has been described above in relation to FIG. 6.

Also in this embodiment it is not necessary for the electrical connection through the cable 458 to have a pair of removable connectors, because during the replacement of the inner connecting rod 422 it is possible to take care of the rewelding the electrical conductors. However, such a pair of removable connectors can be provided, for example on the side of the support body 12.

Vice-versa, a suitable charging port 444 for the connection of a connector of a battery charger (not shown) or a power supply cable is provided on the derailleur 10.

In the case shown, the charging port 444 is housed in and faces from the support body 12. In this case, the cable 458 carries, besides the power supply from the battery power supply unit 440 to the users, the power supply for charging the battery power supply unit 440 from the charging port 444.

In other embodiments, the charging port 444 could be housed in and face from the inner connecting rod 422, close to the compartment 446. In yet others, the charging port 444 could be provided on the outer connecting rod 24, especially if the battery power supply unit 440 is supported by the latter. Finally, the charging port 444 could also be housed in and face from the movable body 16.

The charging port 444 is preferably a USB port.

The electric rear derailleur 10 preferably comprises a charging circuit for supplying a voltage or current controlled over time to the battery power supply unit 440 during charging. The charging circuit can be part of the smart battery, or be housed on a PCB in the compartment 446 or elsewhere, for example close to the charging port 444.

A protective lid (not shown) could be provided to protect the charging port 444 when the cable or charging device is not connected thereto.

Figure 14:
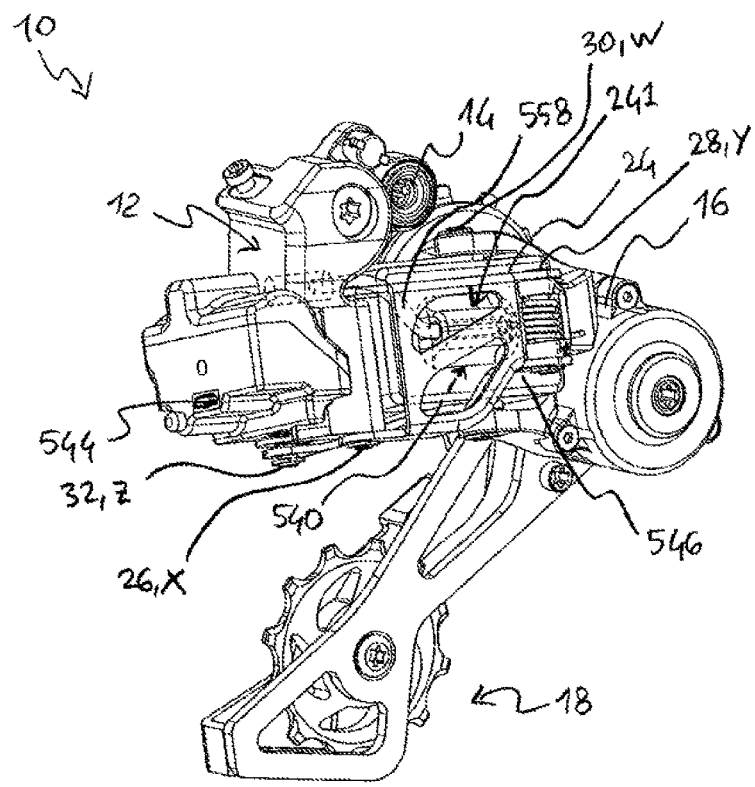
FIG. 14 is a perspective view of an electric rear derailleur according to a fifth embodiment of the invention.
Figure 15:
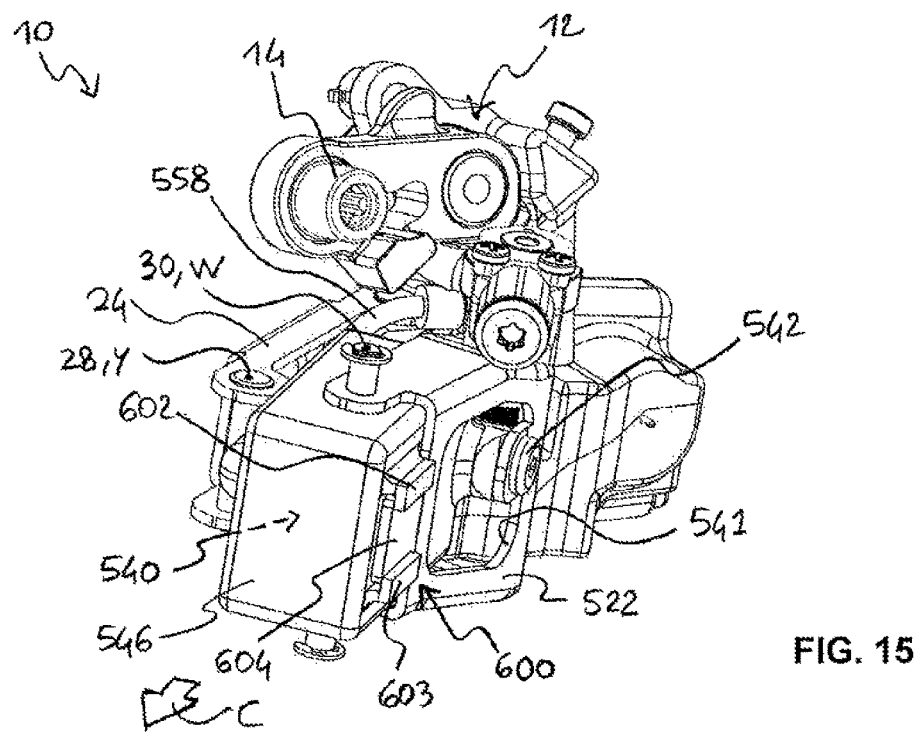
FIG. 15 is a perspective view of the derailleur of FIG. 14, with some components taken away.

FIGS. 14-15 show a fifth embodiment of the invention. In FIG. 15 the rear derailleur 10 is shown with the movable body 16 taken away. Also in this embodiment, the battery power supply unit 540 is not ordinarily removable from the derailleur 10.

In an analogous manner to the third embodiment, a container 546 of the battery power supply unit 540 is provided, said container 546 being supported by the inner connecting rod 522, but being separate and distinct from the inner connecting rod 522.

Also the container 546 is shown fixed to the outer face of the inner connecting rod 522, but all of the generalizations outlined above regarding its positioning on the various faces of the inner connecting rod 522 or of the outer connecting rod 24 hold true.

Also the container 546 is fixed to the inner connecting rod 522 in a removable manner. Merely as an example, the fixing means comprise a screw 542 that crosses the inner connecting rod 522 at a suitable opening and screws into the container 546 of the battery power supply unit 540.

The fixing means further comprise a slider device 600, comprising, in the case shown by way of an example, a sliding guide formed on the container 546 by a pair of projections 602, 603 bent towards one another and a tab 604 formed on the inner connecting rod 522 and configured to slide in the sliding guide.

The tab 604 is located at the longitudinal end of the connecting rod 522 for articulation to the movable body 16, and generically projects towards the movable body 16.

Due to the configuration of the slider device 600, the extraction direction (cf. arrow C) of the battery power supply unit 540 from the inner connecting rod 522 is towards the movable body 16, which prevents such extraction; similarly, the movable body 16 prevents the seating of the battery power supply unit 540 on the inner connecting rod 522.

The battery power supply unit 540 can therefore be coupled with, and removed from, the inner connecting rod 522 only once the movable body 16 has been dismounted, and therefore only for extraordinary interventions.

During maintenance or replacement, the linkage 20 does not stay intact. Unlike the fourth embodiment, in this case it is however possible to easily replace the container 546 only, without the need to replace the whole inner connecting rod 522.

However, it is possible to provide for the extraction direction of the battery power supply unit 540 from the inner connecting rod 522 to be different from that shown.

The container 546 could be fixed to the inner connecting rod 522 through a different slider device or through different types of removable coupling, such as for example snap coupling, shape fitting, force fitting, etcetera.

The container 546 is closed, preferably in a sealed manner, like that of the fourth embodiment and all of the aforementioned generalizations in respect thereto hold true.

Also in this embodiment a charging port 544 is provided for, shown indicatively on the support body 12, but regarding which all of what has been stated above with reference to the fourth embodiment holds true.

Also in this case, since ordinary removability is not intended, it is not necessary for the electrical connection through the cable 558 to have a pair of removable connectors, but such a pair of removable connectors can be provided for, for example on the side of the support body 12.

Advantageously, also in this case the container 546 can be made of a different material from that of the inner connecting rod 522, more suitable for its purpose.

Merely as an example, the inner connecting rod 522 is shown with a weight-reduction window 541. Analogous windows 241 are shown and can optionally be present on the outer connecting rod 24.

The above is a description of various embodiments of inventive aspects, and further changes can be made without departing from the scope of the present invention. The shape and/or size and/or location and/or orientation of the various components can be changed. The functions of a component can be carried out by two or more components and vice-versa. Components shown directly connected to or contacting each other can have intermediate structures arranged between them. The details shown in a figure and/or described with reference to a figure or to an embodiment can apply in other figures or embodiments. Not all of the details shown in a figure or described in a same context have to necessarily be present in a same embodiment. Features or aspects that turn out to be innovative with respect to the prior art, alone or in combination with other features, should be deemed to be described per se, irrespective of what is explicitly described as innovative.

It should be understood that, in all of the embodiments of the electric rear derailleur according to the invention, the configuration of the support body 12, of the movable body 16, of the linkage 20, and of the geared motor 34 can be remarkably different from what has been described above merely as a non-limiting example.

In all of the embodiments of the electric rear derailleur, the geared motor 34 can be replaced by an electric motor only.

It is not necessary for the geared motor 34 to be coupled with, and directly control, the inner connecting rod 22, 222, 322, 422, 522 of the articulated parallelogram linkage 20. It could be coupled with the outer connecting rod 24. Alternatively, the geared motor 34 could be arranged along the diagonal of the articulated parallelogram.

Also the shape of the inner connecting rod 22, 222, 322, 422, 522 and of the outer connecting rod 24 of the linkage 20, in particular with respect to their interaction with the support body 12 and the movable body 16, can also be remarkably different from what is illustrated and described.

As stated many times above, although in the various embodiments shown and described, the battery power supply unit 40, 240, 340, 440, 540 is always supported by the inner connecting rod 22, 222, 322, 422, 522 of the linkage 20, it could be supported by the outer connecting rod 24.

It is also worthwhile emphasizing that the battery power supply unit 40, 240, 340, 440, 540 could be provided only for the power supply of the electronics, the electric motor of the geared motor 34 being instead powered by another battery power supply unit, for example shared with the front derailleur.

Even more so, the battery power supply unit 40, 240, 340, 440, 540 could be provided, as an alternative or in addition, for the power supply of other components and/or equipments of the derailleur 10 or even more generally of the bicycle 1100, even in a mechanical gearshift. More in general, the invention therefore also relates to such a mechanical gearshift having, for the rest, the features indicated above.

Moreover, a container separate and distinct from one of the inner connecting rod and the outer connecting rod, but supported thereby according to the invention, like for example the container 346 of the third embodiment and the container 546 of the fifth embodiment, can also be provided for in existing derailleurs, as an update or retrofit.

A charging port could also be provided in the case of an ordinarily removable battery power supply unit, such as the battery power supply units 40, 240, 340, to be used as an alternative to charging in a suitable charging cradle.

A metallic reinforcement such as the reinforcement 47 of the first embodiment can be provided for, with any suitable or necessary shape modification, also in the other embodiments.

The bicycle 1100 can be provided with a dynamo (not shown) to charge the battery power supply unit 40, 240, 340, 440, 540 during use of the bicycle 1100.

What is claimed is:

1. A bicycle electric rear derailleur comprising:
a support body, configured to be mounted on a frame of a bicycle at an assembly of toothed wheels coaxial with a hub of a rear wheel of the bicycle,
a movable body, comprising a chain guide,
a linkage between the movable body and the support body, comprising an inner connecting rod and an outer connecting rod, having ends that are articulated to the support body and to the movable body to form an articulated parallelogram,
a battery power supply unit,
wherein the battery power supply unit is supported by one of the inner connecting rod and the outer connecting rod.

2. The bicycle electric rear derailleur according to claim 1, wherein the battery power supply unit is supported by the inner connecting rod.

3. The bicycle electric rear derailleur according to claim 1, wherein the battery power supply unit extends mainly:
between a plane defined by articulation axes (Z, X) of the connecting rods to the support body, and a plane defined by articulation axes (W, Y) of the connecting rods to the movable body and/or
between a plane defined by articulation axes (Z, W) of the inner connecting rod, and a plane defined by articulation axes (X, Y) of the outer connecting rod.

4. The bicycle electric rear derailleur according to claim 1, wherein the battery power supply unit is seated in a compartment made in said one of the inner connecting rod and the outer connecting rod.

5. The bicycle electric rear derailleur according to claim 1, wherein the battery power supply unit is housed in a container supported by, but separate and distinct from, said one of the inner connecting rod and the outer connecting rod.

6. The bicycle electric rear derailleur according to claim 4, wherein the battery power supply unit is removably held in said compartment.

7. The bicycle electric rear derailleur according to claim 4, wherein the battery power supply unit is inserted within said compartment, and the compartment is firmly closed, preferably in a sealed manner.

8. The bicycle electric rear derailleur according to claim 5, wherein the container is fixed to said one of the inner connecting rod and the outer connecting rod in a manner selected from the group consisting of:
through threaded coupling devices,
through a screw system and a slider device that defines a seating-and-extraction direction of the battery power supply unit, and
through co-moulding.

9. The bicycle electric rear derailleur according to claim 6, wherein the battery power supply unit has a laterally projecting wall that, in a seated condition of the battery power supply unit, abuts on a mouth of said compartment, preferably sealing means being provided between the battery power supply unit and said compartment, more preferably the battery power supply unit being removably held in said compartment, through a strap.

10. The bicycle electric rear derailleur according to claim 4, wherein on a bottom of said compartment there is provided at least one of:
an elastic element configured to bias the battery power supply unit in an exiting direction from the compartment, or
a threaded coupling between the battery power supply unit and said compartment.

11. The bicycle electric rear derailleur according to claim 1, wherein at least said one of the inner connecting rod and the outer connecting rod is made of composite material comprising a polymeric matrix with reinforcing fiber, and preferably comprises a metallic reinforcing element.

12. The bicycle electric rear derailleur according to claim 8, wherein the container is fixed to said one of the inner connecting rod and the outer connecting rod through co-moulding, said one of the inner connecting rod and the outer connecting rod is made of metallic material and said container is made of plastic material.

13. The bicycle electric rear derailleur according to claim 1, comprising a charging port provided for removable connection of the battery power supply unit to a battery-charger or to a cable.

14. The bicycle electric rear derailleur according to claim 13, wherein the charging port is supported onto and faces from an element selected from the group consisting of:
the support body,
said one of the inner connecting rod and the outer connecting rod, and
the movable body, preferably the chain guide.

15. The bicycle electric rear derailleur according to claim 1, comprising an electric motor or a geared motor comprising an electric motor, which controls the linkage to move the chain guide among the toothed wheels, preferably wherein the battery power supply unit is provided for the power supply of the electric motor and/or of at least some electric or electronic components of the derailleur, and more preferably wherein a flexible cable is provided, that connects a compartment or a container which houses the battery power supply unit and the support body.

16. The bicycle electric rear derailleur according to claim 1, wherein the battery power supply unit comprises a pair of negative and positive electric contacts, a track of the negative electric contact being made longer than a track of the positive electric contact.

17. The bicycle electric rear derailleur according to claim 5, wherein the battery power supply unit is removably held in said container.

18. The bicycle electric rear derailleur according to claim 5, wherein the battery power supply unit is inserted within said container, and the container is firmly closed, preferably in a sealed manner.

19. The bicycle electric rear derailleur according to claim 17, wherein the battery power supply unit has a laterally projecting wall that, in a seated condition of the battery power supply unit, abuts on a mouth of said container, preferably sealing means being provided between the battery power supply unit and said container, more preferably the battery power supply unit being removably held in said container, through a strap.

20. The bicycle electric rear derailleur according to claim 5, wherein on a bottom of said container there is provided at least one of:
an elastic element configured to bias the battery power supply unit in an exiting direction from the container, or
a threaded coupling between the battery power supply unit and said container.

* * * * *